(12) United States Patent
Lee et al.

(10) Patent No.: US 8,780,215 B2
(45) Date of Patent: Jul. 15, 2014

(54) APPARATUS AND METHOD FOR PROCESSING AN IMAGE TO CORRECT IMAGE DISTORTION CAUSED BY A HAND SHAKE

(75) Inventors: Young-Shin Lee, Seoul (KR); Jin-Suk Yun, Seoul (KR); Bong-Su Kang, Seoul (KR)

(73) Assignee: Core Logic, Inc., Seoul (KR)

( * ) Notice: Subject to any disclaimer, the term of this patent is extended or adjusted under 35 U.S.C. 154(b) by 1142 days.

(21) Appl. No.: 12/215,202

(22) Filed: Jun. 25, 2008

(65) Prior Publication Data

US 2008/0316334 A1 Dec. 25, 2008

(30) Foreign Application Priority Data

Jun. 25, 2007 (KR) ........................ 10-2007-0062099

(51) Int. Cl.
*H04N 5/228* (2006.01)

(52) U.S. Cl.
USPC ...................................................... 348/208.6

(58) Field of Classification Search
USPC ...................................................... 348/208.6
See application file for complete search history.

(56) References Cited

U.S. PATENT DOCUMENTS

| 2001/0022861 A1* | 9/2001 | Hiramatsu | 382/291 |
| 2003/0090577 A1* | 5/2003 | Shirakawa | 348/222.1 |
| 2005/0207644 A1* | 9/2005 | Kitagawara et al. | 382/167 |
| 2006/0008173 A1* | 1/2006 | Matsugu et al. | 382/274 |
| 2006/0238828 A1* | 10/2006 | Kanno et al. | 358/474 |
| 2007/0097443 A1* | 5/2007 | Ishiguro et al. | 358/3.26 |
| 2007/0115503 A1* | 5/2007 | Nakami et al. | 358/1.16 |

* cited by examiner

*Primary Examiner* — Usman Khan
(74) *Attorney, Agent, or Firm* — Lowe Hauptman & Ham, LLP

(57) ABSTRACT

Provided is an apparatus and method for processing an image which can correct image distortion caused by hand shake. The apparatus includes: a reference image acquiring unit for acquiring a first and a second reference images by using different shutter times and international standard organization (ISO) values; and a color information correcting unit for correcting color information of an input image, which is obtained by using a shutter time that is shorter of the shutter times used to acquire the first and the second reference images, based on a brightness ratio and a chrominance ratio of the first and second reference images. Accordingly, image distortion caused by hand shake can be corrected.

28 Claims, 5 Drawing Sheets

APPARATUS AND METHOD FOR PROCESSING AN IMAGE TO CORRECT IMAGE DISTORTION CAUSED BY A HAND SHAKE

CROSS-REFERENCE TO RELATED PATENT APPLICATION

This application claims the benefit of Korean Patent Application No. 10-2007-0062099, filed on Jun. 25, 2007, in the Korean Intellectual Property Office, the disclosure of which is incorporated herein in its entirety by reference.

BACKGROUND OF THE INVENTION

1. Field of the Invention

The present invention relates to an apparatus and method for processing an image, and more particularly, to an apparatus and method for processing an image, which can correct image distortion caused by a hand shake.

2. Description of the Related Art

Attempts have been made to correct still image distortion caused by hand shake by properly adjusting the position of a lens or a sensor by using a gyrometer in a digital camera. That is, physically shaking variables have been removed by moving the lens or sensor in a direction opposite to the detected camera shake. Other attempts have been made to correct still image distortion caused by hand shake by photographing a plurality of images in short shutter intervals and calculating position differences between the images.

However, the first attempts of using the gyrometer have disadvantages in that a camera module requires not only the gyrometer but also hardware for moving the lens or the sensor, which is not suitable for the trend toward a smaller mobile phone camera. The second attempts of calculating the position differences by using the plurality of images have disadvantages in that a camera module requires a frame memory capable of storing the plurality of images and it is difficult to directly mount the frame memory on the camera module because the amount of calculated data stored in the frame memory is so huge.

SUMMARY OF THE INVENTION

The present invention provides an apparatus and method for correcting still image distortion caused by hand shake without using an additional device such as a gyrometer.

The present invention also provides an apparatus and method for processing an image, which can efficiently correct still image distortion caused by hand shake while reducing the amount of calculated data stored in a memory.

The present invention also provides an apparatus and method for processing an image which can solve problems, such as camera shake, noise, and poor color reproduction, caused when a shutter time of a lens is lengthened in a dark environment.

According to an aspect of the present invention, there is provided an apparatus for processing an image, the apparatus comprising: a reference image acquiring unit for acquiring a first and a second reference images by using different shutter times and international standard organization (ISO) values; and a color information correcting unit for correcting color information of an input image, which is obtained by using a shutter time that is the shorter of the shutter times used to acquire the first and the second reference images, based on a brightness ratio and a chrominance ratio of the first and the second reference images.

The reference image acquiring unit may acquire the first reference image by using a first shutter time and a first ISO value, and acquire the second reference image by using a second shutter time, which is longer than the first shutter time, and a second ISO value, which is less than the first ISO value.

The second shutter time may be 4 to 8 times longer than the first shutter time, and the first ISO value may be 4 to 8 times greater than the second ISO value.

Each of the reference images may have a resolution that is lower than the resolution of the input image.

The color information correcting unit may comprise: a brightness histogram analyzing unit analyzing a brightness histogram of the first reference image and a brightness histogram of the second reference image; a brightness correction calculating unit correcting brightness of the input image on the basis of brightness histogram transformation between the first reference image and the second reference image; a chrominance information extracting unit extracting chrominance information of corresponding pixels of the first reference image and the second reference image; and a chrominance information correction calculating unit correcting chrominance information of the input image on the basis of the chrominance information of the corresponding pixels of the first reference image and the second reference image.

The brightness histogram analyzing unit may define: a first minimum level where the first minimum level is a brightness level corresponding to the first occurrence of a predetermined number of pixels in the brightness histogram of the first reference image; a first maximum level where the first maximum level is a brightness level corresponding to the last occurrence of a predetermined number of pixels in the brightness histogram of the first reference image; a second minimum level where the second minimum level is a brightness level corresponding to the first occurrence of a predetermined number of pixels in the brightness histogram of the second reference image; and a second maximum level where the second maximum level is a brightness level corresponding to the last occurrence of a predetermined number of pixels in the brightness histogram of the second reference image.

The brightness correction calculating unit may stretch a brightness histogram of the input image on the basis of a difference between the second minimum level and the first minimum level and a difference between the second maximum level and the first maximum level.

The chrominance information extracting unit may extract first blue chrominance information that is an average of blue chrominance signals of a first N×N region (N is a positive number), at the center of which a corresponding pixel of the first reference image is located, first red chrominance information that is an average of red chrominance signals of the first N×N region, second blue chrominance information that is an average of blue chrominance signals of a second N×N region, at the center of which a corresponding pixel of the second reference image is located, and second red chrominance information that is an average of red chrominance signals of the second N×N region.

The chrominance information correction calculating unit may correct blue chrominance information of the input image by applying as a weight a ratio between the second blue chrominance information and the first blue chrominance information, and correct red chrominance information of the input image by applying as a weight a ratio between the second red chrominance information and the first red chrominance information.

The chrominance information correction calculating unit may correct blue chrominance information of the input image by applying as a weight a ratio between the first blue chrominance information and blue chrominance information of a corresponding pixel of the input image, and correct red chrominance information of the input image by applying as a weight a ratio between the first red chrominance information and red chrominance information of a corresponding pixel of the input image.

The chrominance information correction calculating unit may correct blue chrominance information of the input image by applying as a weight a ratio between the second blue chrominance information and blue chrominance information of a corresponding pixel of the second reference image, and correct red chrominance information of the input image by applying as a weight a ratio between the second red chrominance information and red chrominance information of a corresponding pixel of the second reference image.

The apparatus may further comprise a noise removing unit removing noise included in the input image on the basis of edge information of the input image.

The noise removing unit may comprise: a brightness change direction information extracting unit extracting brightness change direction information of the color information corrected image; an edge information extracting unit extracting edge information of the color information corrected image on the basis of the brightness change direction information; and a noise reduction calculating unit reducing noise included in the color information corrected image on the basis of the edge information.

The brightness change direction information may be generated on the basis of brightness changes in 8 directions of a region of interest about a pixel of interest.

The apparatus may further comprise a brightness correcting unit correcting brightness of the image whose color information is corrected according to a gamma curve based on a brightness histogram of the image whose color information is corrected.

The brightness correcting unit may comprise: a brightness information extracting unit extracting brightness information of the color information corrected image on the basis of the brightness histogram of the color information corrected image; a gamma curve generating unit generating a gamma curve on the basis of the brightness information of the color information corrected image; and a gamma curve applying unit applying the generated gamma curve to the color information corrected image.

The brightness histogram of the color information corrected image may be generated by $N_H$-Quantization.

According to another aspect of the present invention, there is provided a method of processing an image, the method comprising: acquiring two reference images by using different shutter times and ISO values; and correcting color information of an input image, which is obtained by using a shutter time that is shorter of the shutter times used to acquire the reference images, based on a brightness ratio and a chrominance ratio of the two reference images.

The acquiring of the two reference images may comprise acquiring a first reference image by using a first shutter time and a first ISO value, and acquiring a second reference image by using a second shutter time, which is longer than the first shutter time, and a second ISO value, which is less than the first ISO value.

The second shutter time may be 4 to 8 times longer than the first shutter time, and the first ISO value may be 4 to 8 times greater than the second ISO value.

Each of the first and second reference images may have a resolution that is lower than the resolution of the input image.

The correcting of the color information may comprise: analyzing a brightness histogram of the first reference image and a brightness histogram of the second reference image; correcting brightness of the input image on the basis of brightness histogram transformation between the first reference image and the second reference image; extracting chrominance information of corresponding pixels of the first reference image and the second reference image; and correcting chrominance information of the input image on the basis of the chrominance information of the corresponding pixels of the first reference image and the second reference image.

The analyzing of the brightness histogram may comprise defining: a first minimum level where the first minimum level is a brightness level corresponding to the first occurrence of a predetermined number of pixels in the brightness histogram of the first reference image; a first maximum level where the first maximum level is a brightness level corresponding to the last occurrence of a predetermined number of pixels in the brightness histogram of the first reference image; a second minimum level where the second minimum level is a brightness level corresponding to the first occurrence of a predetermined number of pixels in the brightness histogram of the second reference image; and a second maximum level where the second maximum level is a brightness level corresponding to the last occurrence of a predetermined number of pixels in the brightness histogram of the second reference image.

The correcting of the brightness may comprise stretching a brightness histogram of the input image on the basis of a difference between the second minimum level and the first minimum level and a difference between the second maximum level and the first maximum level.

The extracting of the chrominance information may comprise extracting: first blue chrominance information that is an average of blue chrominance signals of a first N×N region (N is a positive number) about a corresponding pixel of the first reference image; first red chrominance information that is an average of red chrominance signals of the first N×N region; second blue chrominance information that is an average of blue chrominance signals of a second N×N region about a corresponding pixel of the second reference image; and second red chrominance information that is an average of red chrominance signals of the second N×N region The correcting of the chrominance information may comprise: correcting blue chrominance information of the input image by applying as a weight a ratio between the second blue chrominance information and the first blue chrominance information; and correcting red chrominance information of the input image by applying as a weight a ratio between the second red chrominance information and the first red chrominance information.

The correcting of the chrominance information may comprise: correcting blue chrominance information of the input image by applying as a weight a ratio between the first blue chrominance information and blue chrominance information of a corresponding pixel of the input image; and correcting red chrominance information of the input image by applying as a weight a ratio between the first red chrominance information and red chrominance information of a corresponding pixel of the input image.

The correcting of the chrominance information may comprise: correcting blue chrominance information of the input image by applying as a weight a ratio between the second blue chrominance information and blue chrominance information of a corresponding pixel of the second reference image; and correcting red chrominance information of the input image by applying as a weight a ratio between the second red chrominance information and red chrominance information of a corresponding pixel of the second reference image.

The method may further comprise removing noise included in the input image on the basis of edge information of the input image, after the correcting of the color information.

The removing of the noise may comprise: extracting brightness change direction information of the color information corrected image; extracting edge information of the color information corrected image on the basis of the brightness change direction information; and reducing noise included in the color information corrected image on the basis of the edge information.

The brightness change direction information may be generated on the basis of brightness changes in 8 directions of a region of interest about a pixel of interest.

The method may further comprise correcting brightness of the color information corrected image according to a gamma curve based on a brightness histogram of the color information corrected image, after the correcting of the color information.

The correcting of the brightness may comprise: extracting brightness information of the color information corrected image on the basis of the brightness histogram of the color information corrected image; generating a gamma curve on the basis of the brightness information of the color information corrected image; and applying the generated gamma curve to the color information corrected image.

The brightness histogram of the color information corrected image may be generated by $N_H$-Quantization.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
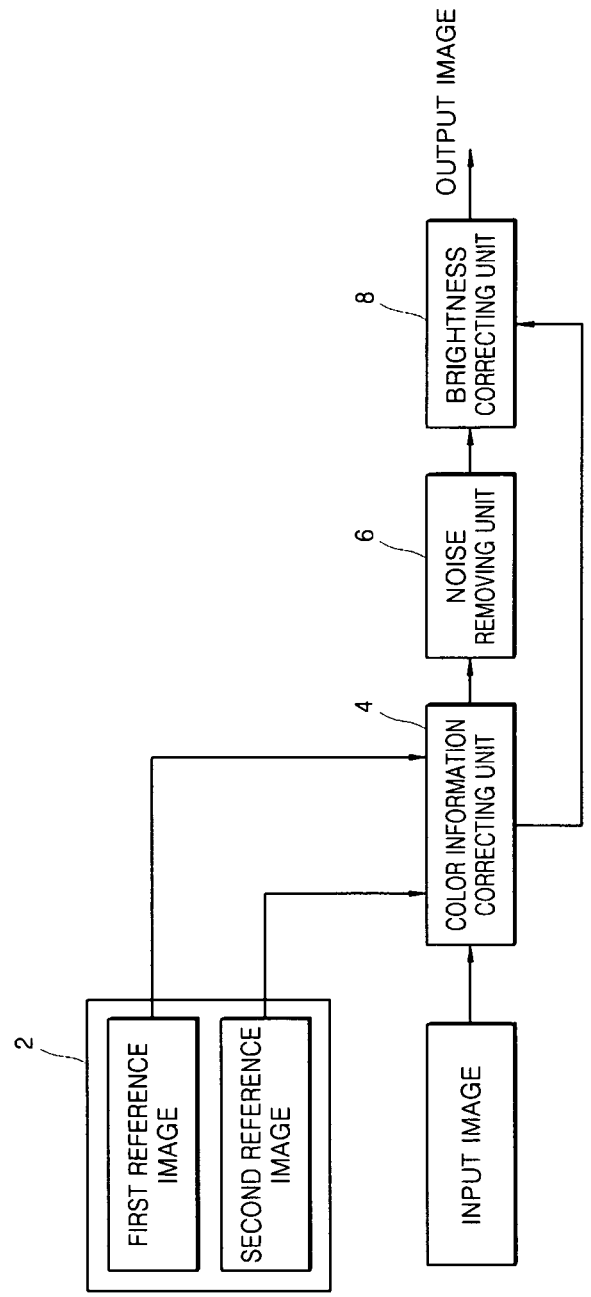
FIG. 1 is a block diagram of an apparatus for processing an image, according to an embodiment of the present invention.

FIG. 1 is a bock diagram of an apparatus for processing an image, according to an embodiment of the present invention. Referring to FIG. 1, the apparatus includes a reference image acquiring unit 2 and a color information correcting unit 4.

The reference image acquiring unit 2 acquires two, first and second reference images of successive frames by using different shutter times and international standard organization (ISO) values.

The reference image acquiring unit 2 may acquire a first reference image by using a first shutter time and a first ISO value, and a second reference image by using a second shutter time, which is longer than the first shutter time, and a second ISO value, which is less than the first ISO value. In a dark environment, a shutter time of a camera is lengthened and during the lengthened shutter time, the camera held in hand may be shaken, resulting in a blurred image. When the shutter time is manually shortened in order to solve this problem, a camera sensor is not provided with a sufficient amount of light, resulting in insufficient brightness and poor color reproduction. When an ISO value is increased in order to solve the problem of poor color reproduction, noise in an image is increased. In order to avoid such trade off and reduce noise and improve brightness and color reproduction, the apparatus according to the present invention acquires a first reference image without shake by shortening a shutter time, and acquires a second reference image with sufficient brightness and color information by lengthening a successive shutter time. A value acquired by comparing brightness and color information between the first and second reference images is applied to a full-size input image using the shorter shutter time. In detail, when a shutter time is long, an image may be slightly shaken but may have sufficient brightness and color reproduction. When a shutter time is short, an image may not be shaken but may have insufficient brightness and color information. In order to compensate for the insufficient color information, an ISO value may be increased above a given value. In this case, however, lots of noise may be included in the image. The first and the second reference images are used as reference information when the color information correcting unit 4 corrects the brightness and color information of a full-size input image by using the shorter shutter time. The input image is acquired by using the shorter shutter time and the high ISO value used to acquire the first reference image.

The second shutter time used for the second reference image may be 4 to 8 times longer than the first shutter time used for the first reference image. The first ISO value used for the first reference image may be 4 to 8 times greater than the second ISO value used for the second reference image.

Each of the first reference image and the second reference image may have a resolution less than that of the full-size input image in consideration of the amount of calculated data stored in a memory.

For example, each of the first reference image and the second reference image may be acquired as a preview-size image in consideration of available memory size.

The color information correcting unit 4 corrects color information of the input image, which is acquired by using the shutter time that is shorter of the shutter times of the first reference image and the second reference image, based on a brightness ratio and a chrominance ratio between the first reference image and the second reference image.

Figure 2:
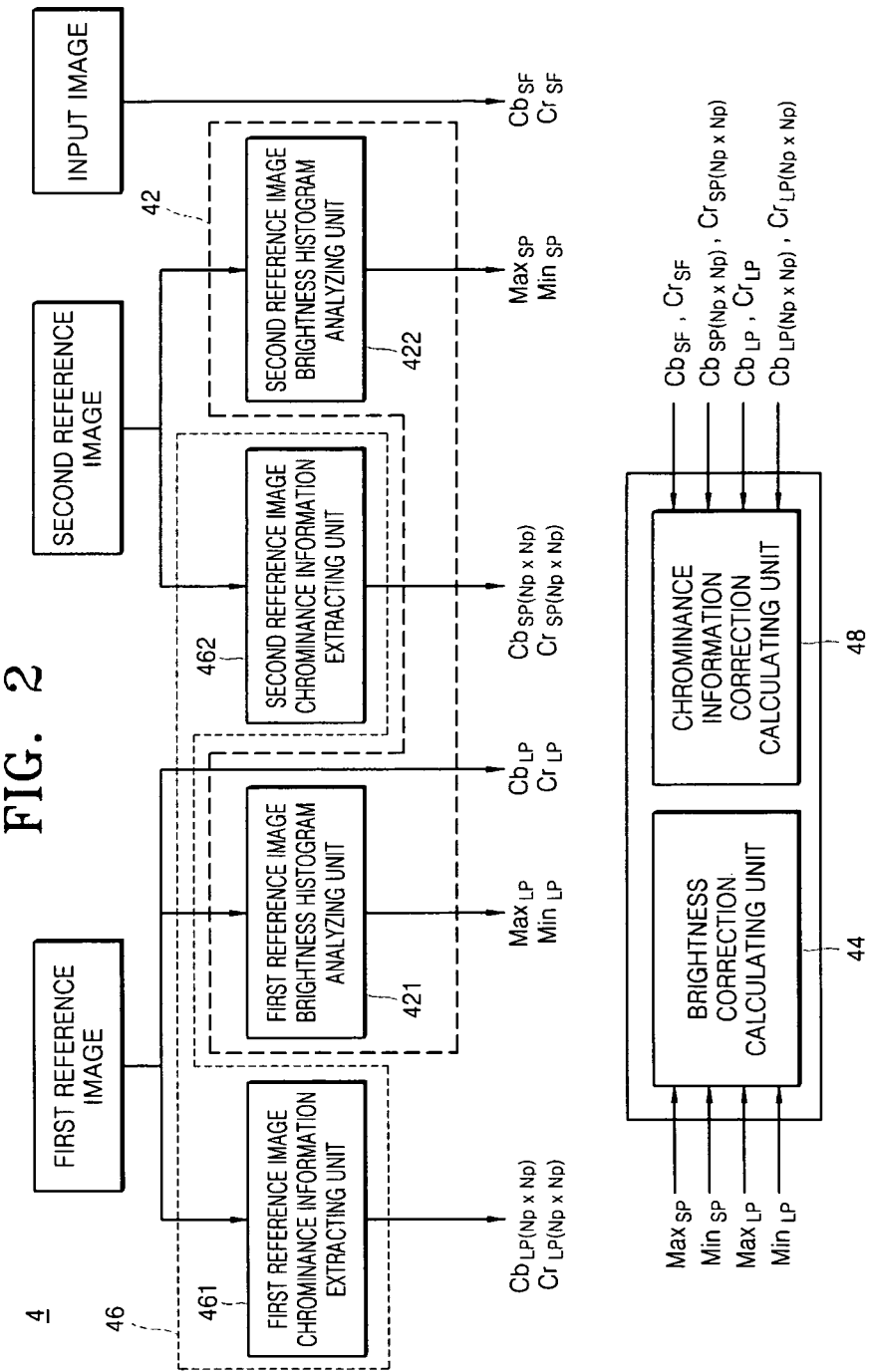
FIG. 2 is a block diagram of a color information correcting unit included in the apparatus of FIG. 1, according to an embodiment of the present invention.

FIG. 2 is a block diagram of the color information correcting unit 4 included in the apparatus of FIG. 1, according to an embodiment of the present invention. Referring to FIG. 2, the color information correcting unit 4 may include a brightness histogram analyzing unit 42, a brightness correction calculating unit 44, a chrominance information extracting unit 46, and a chrominance information correction calculating unit 48.

The brightness histogram analyzing unit 42 analyzes a brightness histogram of the first reference image and a brightness histogram of the second reference image.

Figure 3:
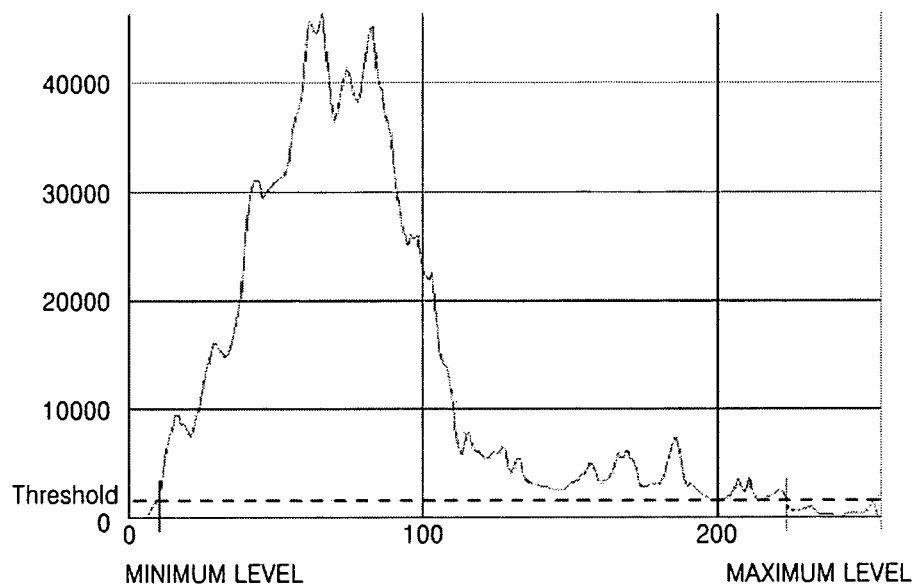
FIG. 3 is a graph illustrating the operation of a brightness histogram analyzing unit included in the apparatus of FIG. 1, according to an embodiment of the present invention.

The brightness histogram analyzing unit 42 may define a first level, having a value greater than a predetermined pixel number in the brightness histogram of the first reference image, as a first minimum level $Min_{LF}$, define a last level, having a value greater than the predetermined pixel number in the brightness histogram of the first reference image, as a first maximum level $Max_{LP}$, define a first level, having a value greater than the predetermined pixel number in the brightness histogram of the second reference image, as a second minimum level $Min_{SP}$, and define a last level, having a value greater than the predetermined pixel number in the brightness histogram of the second reference image, as a second maximum level $Max_{SP}$. The operation of the brightness histogram analyzing unit 42 will now be explained with reference to FIG. 3. FIG. 3 is a graph illustrating the brightness histograms of the first and second reference images, according to an embodiment of the present invention. In FIG. 3, the horizontal axis represents a brightness level, and the vertical axis represents the number of pixels. For example, when a threshold value is 10 pixels, the brightness histogram analyzing unit 42 defines first brightness levels, having values greater than the threshold value in the brightness histograms of the first reference image and the second reference image, as a first minimum level $Min_{LP}$ and a second minimum level $Min_{SP}$, respectively, and defines last brightness levels having values greater than the threshold value in the brightness histograms of the first reference image and the second reference image, as a first maximum level $Max_{LP}$ and a second maximum level $Max_{SP}$, respectively.

The brightness correction calculating unit 44 corrects the brightness of the input image on the basis of brightness histogram transformation that compensates for a difference in shape between the brightness histogram of the first reference image and the brightness histogram of the second reference image. In detail, the brightness correction calculating unit 44 corrects the brightness of the input image by stretching a brightness histogram of the input image on the basis of a difference between the second minimum level $Min_{SP}$ and the first minimum level $Min_{LP}$ and a difference between the second maximum level $Max_{SP}$ and the first maximum level $Max_{LP}$. As described above, the first minimum level $Min_{LP}$ and the first maximum level $Max_{LP}$ indicate a brightness level of the first reference image to which the shorter shutter time is applied, and the second minimum level $Min_{SP}$ and the second maximum level $Max_{SP}$ indicate a brightness level of the second reference image to which the longer shutter time is applied. For example, the brightness correction calculating unit 44 may correct the brightness of the input image by proportioning the brightness of the input image by referring to a lock up table (LUT) including the first minimum level $Min_{LP}$, the second minimum level $Min_{SP}$, the first maximum level $Max_{LP}$, and the second maximum level $Max_{SP}$.

The chrominance information extracting unit 46 extracts chrominance information of corresponding pixels of the first reference image and the second reference image. The chrominance information extracting unit 46 may accumulate chrominance information within a region of a predetermined size about each pixel of the first and second reference images.

The chrominance information extracting unit 46 may extract first blue chrominance information $Cb_{LP(Np\ Np)}$ that is an average of blue chrominance signals of a first N×N region, at the center of which a corresponding pixel of the first reference image is located, first red chrominance information $Cr_{LP(Np\ Np)}$ that is an average of red chrominance signals of the first N×N region, second blue chrominance information $Cb_{SP(Np\ Np)}$ that is an average of blue chrominance signals of a second N×N region, at the center of which a corresponding pixel of the second reference image is located, and second red chrominance information $Cr_{SP(Np\ Np)}$ that is an average of red chrominance signals of the second N×N region.

The chrominance information correction calculating unit 48 corrects chrominance information of the input image on the basis of the chrominance information received from the chrominance information extracting unit 46.

The chrominance information correction calculating unit 48 may correct blue chrominance information $Cb_{SF}$ of the input image by applying as a weight a ratio between the second blue chrominance information $Cb_{SP(Np\ Np)}$ and the first blue chrominance information $Cb_{LP(Np\ Np)}$, and correct red chrominance information $Cr_{SF}$ of the input image by applying as a weight a ratio between the second red chrominance information $Cr_{SP(Np\ Np)}$ and the first chrominance information $Cr_{LP(Np\ Np)}$.

The chrominance information correction calculating unit 48 may correct blue chrominance information $Cb_{SF}$ of the input image by applying as a weight a ratio between the first blue chrominance information $Cb_{LP(Np\ Np)}$ and blue chrominance information $Cb_{SF}$ of a corresponding pixel of the input image, and correct red chrominance information $Cr_{SF}$ of the input image by applying as a weight a ratio between the first red chrominance information $Cr_{LP(Np\ Np)}$ and red chrominance information $Cr_{SF}$ of a corresponding pixel of the input image.

The chrominance information correction calculating unit 48 may correct blue chrominance information $Cb_{SF}$ of the input image by applying as a weight a ratio between the second blue chrominance information $Cb_{SP(Np\ Np)}$ and blue chrominance information of a corresponding pixel of the second reference image, and corrects red chrominance information $Cr_{SF}$ of the input image by applying as a weight a ratio between the second red chrominance information $Cr_{SP(Np\ Np)}$ and red chrominance information of a corresponding pixel of the second reference image.

The apparatus of FIG. 1 may further include a noise removing unit 6. The noise removing unit 6 removes noise included in the input image on the basis of edge information of the input image. That is, the noise removing unit 6 determines whether edges exist by defining an association function with neighboring pixels with respect to a brightness signal of the image input from the color information correcting unit 4.

Figure 4:
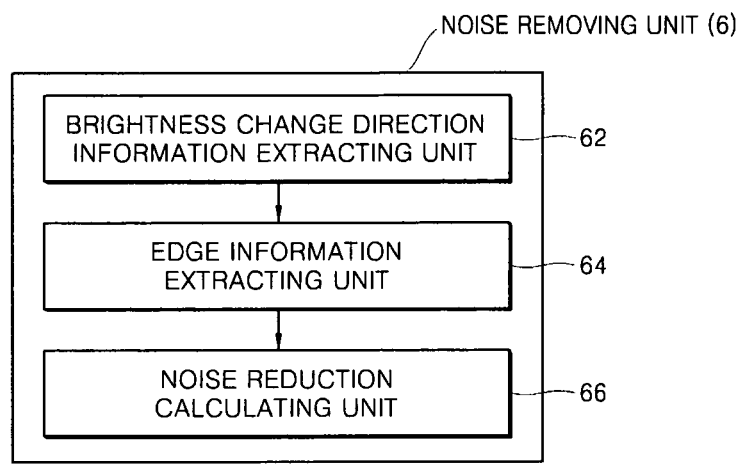
FIG. 4 is a block diagram of a noise removing unit included in the apparatus of FIG. 1, according to an embodiment of the present invention.

FIG. 4 is a block diagram of the noise removing unit 6 included in the apparatus of FIG. 1, according to an embodiment of the present invention. Referring to FIG. 4, the noise removing unit 6 may include a brightness change direction information extracting unit 62, an edge information extracting unit 64, and a noise reduction calculating unit 66.

The brightness change direction information extracting unit 62 extracts brightness change direction information of the color information corrected image received from the color information correcting unit 4. The brightness change direction information may be generated on the basis of brightness changes in 8 directions of a region of interest about a pixel of interest.

The edge information extracting unit 64 extracts edge information of the color information corrected image on the basis of the brightness change direction information received from the brightness change direction information extracting unit 62.

The noise reduction calculating unit 66 reduces noise included in the color information corrected image on the basis of the edge information of the color information corrected image received from the edge information extracting unit 64.

The apparatus of FIG. 1 may further include a brightness correcting unit 8. The brightness correcting unit 8 finally corrects the brightness of the color information corrected image according to a gamma curve based on the brightness histogram of the color information corrected image.

Figure 5:
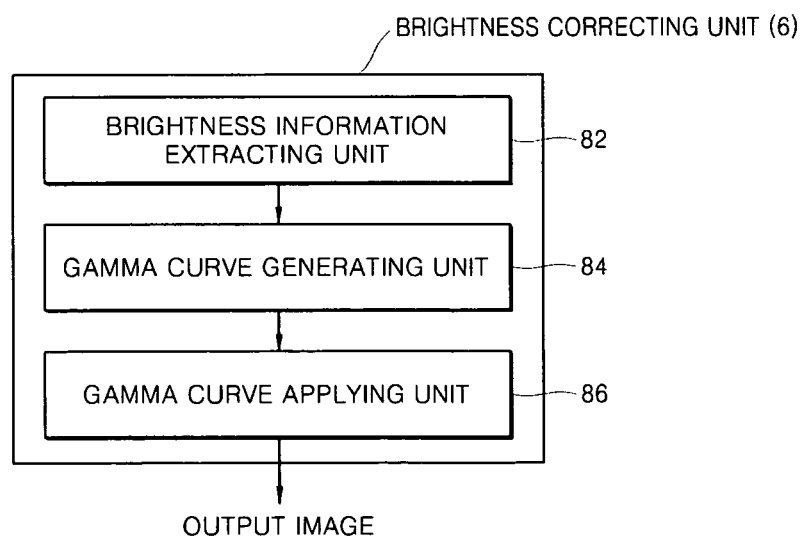
FIG. 5 is a block diagram of a brightness correcting unit included in the apparatus of FIG. 1, according to an embodiment of the present invention.

FIG. 5 is a block diagram of the brightness correcting unit 8 included in the apparatus of FIG. 1 according to an embodiment of the present invention. Referring to FIG. 5, the brightness correcting unit 8 may include a brightness information extracting unit 82, a gamma curve generating unit 84, and a gamma curve applying unit 86.

The brightness information extracting unit 82 extracts brightness information of the color information corrected image on the basis of the brightness histogram of the color information corrected image. The brightness histogram of the color information corrected image may be generated by $N_H$-Quantization.

The gamma curve generating unit 84 generates a gamma curve on the basis of the brightness information of the image of which color information is corrected.

The gamma curve applying unit 86 applies the generated gamma curve to the color information corrected image, so as to generate an output image.

Figure 6:
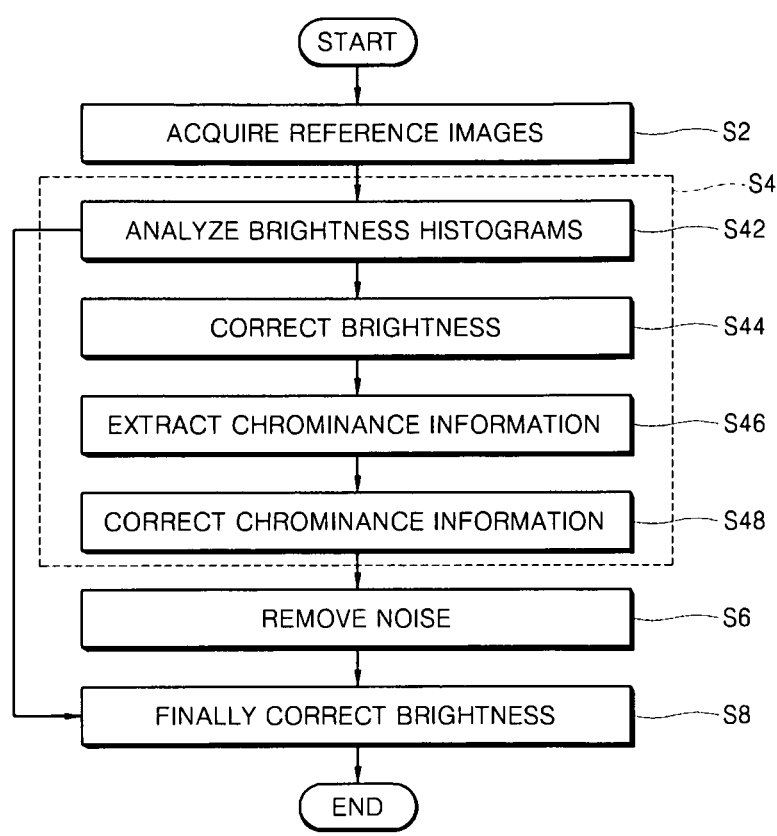
FIG. 6 is a flowchart illustrating a method of processing an image, according to an embodiment of the present invention.

FIG. 6 is a flowchart illustrating a method of processing an image according to an embodiment of the present invention. Referring to FIG. 6, the method includes operation S2 in which reference images are acquired, operation S4 in which color information is corrected, operation S6 in which noise is removed, and operation S8 in which brightness is finally corrected. Operation S4 includes operation S42 in which brightness histograms are analyzed, operation S44 in which brightness is corrected, operation S46 in which chrominance information is extracted, and operation S48 in which chrominance information is corrected.

The principle of the method of FIG. 6 is substantially the same as that of the apparatus of FIG. 1, which has been described above in detail, and thus a detailed explanation of the method of FIG. 6 will not be given.

As described above, the apparatus and method for processing the image according to the present invention can correct still image distortion caused by hand shake without using an addition device such as a gyrometer.

Furthermore, the apparatus and method according to the present invention can efficiently correct still image distortion caused by a hand shake while reducing the amount of calculated data stored in a memory.

Moreover, the apparatus and method according to the present invention can solve problems, such as camera shake, noise, and poor color reproduction, caused when a shutter time of a lens is lengthened in a dark environment.

While the present invention has been particularly shown and described with reference to exemplary embodiments thereof, it will be understood by one of ordinary skill in the art that various changes in form and detail may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for processing an image to correct image distortion caused by a hand shake, the apparatus comprising:
    a reference image acquiring unit for acquiring a first and a second reference images by using different shutter times associated with the hand shake, an amount of light, brightness and color reproduction, and international standard organization (ISO) values associated with noise in an image;
    a color information correcting unit for correcting color information of an input image, which is obtained by using a shutter time used to acquire the first reference image, based on a brightness ratio and a chrominance ratio of the first and the second reference images; and
    a noise removing unit for removing noise in the input image based on edge information of the input image,
    wherein the reference image acquiring unit acquires the first reference image by using a first shutter time and a first ISO value, and acquires the second reference image by using a second shutter time, which is longer than the first shutter time, and a second ISO value, which is less than the first ISO value,
    wherein the noise removing unit comprises:
    a brightness change direction information extracting unit for extracting brightness change direction information of a color information corrected image;
    an edge information extracting unit for extracting edge information of the color information corrected image based on the brightness change direction information; and
    a noise reduction calculating unit for reducing noise in the color information corrected image based on the edge information, and
    wherein the first reference image and the second reference image are successive frames.

2. The apparatus of claim 1, wherein the second shutter time is 4 to 8 times longer than the first shutter time, and the first ISO value is 4 to 8 times greater than the second ISO value.

3. The apparatus of claim 1, wherein each of the reference images has a resolution that is lower than a resolution of the input image.

4. The apparatus of claim 3, wherein each of the reference images is a preview-size image and the input image is a full-size image.

5. The apparatus of claim 1, wherein the color information correcting unit comprises:
    a brightness histogram analyzing unit for analyzing a brightness histogram of the first reference image and a brightness histogram of the second reference image;
    a brightness correction calculating unit for correcting brightness of the input image based on brightness histogram transformation between the first reference image and the second reference image;
    a chrominance information extracting unit for extracting chrominance information of corresponding pixels of the first reference image and the second reference image; and
    a chrominance information correction calculating unit for correcting chrominance information of the input image based on the chrominance information of the corresponding pixels of the first reference image and the second reference image.

6. The apparatus of claim 5, wherein the brightness histogram analyzing unit defines:
    a first minimum level where the first minimum level is a brightness level corresponding to a first occurrence of a predetermined number of pixels in the brightness histogram of the first reference image;
    a first maximum level where the first maximum level is a brightness level corresponding to a last occurrence of a predetermined number of pixels in the brightness histogram of the first reference image;
    a second minimum level where the second minimum level is a brightness level corresponding to a first occurrence of a predetermined number of pixels in the brightness histogram of the second reference image; and
    a second maximum level where the second maximum level is a brightness level corresponding to a last occurrence of a predetermined number of pixels in the brightness histogram of the second reference image.

7. The apparatus of claim 6, wherein the brightness correction calculating unit stretches a brightness histogram of the input image based on a difference between the second minimum level and the first minimum level and a difference between the second maximum level and the first maximum level.

8. The apparatus of claim 5, wherein the chrominance information extracting unit extracts:
   first blue chrominance information that is an average of blue chrominance signals of a first N×N region (N is a positive number), at a center of which a corresponding pixel of the first reference image is located;
   first red chrominance information that is an average of red chrominance signals of the first N×N region;
   second blue chrominance information that is an average of blue chrominance signals of a second N×N region, at a center of which a corresponding pixel of the second reference image is located; and
   second red chrominance information that is an average of red chrominance signals of the second N×N region.

9. The apparatus of claim 8, wherein the chrominance information correction calculating unit:
   corrects blue chrominance information of the input image by applying as a weight a ratio between the second blue chrominance information and the first blue chrominance information; and
   corrects red chrominance information of the input image by applying as a weight a ratio between the second red chrominance information and the first red chrominance information.

10. The apparatus of claim 8, wherein the chrominance information correction calculating unit:
    corrects blue chrominance information of the input image by applying as a weight a ratio between the first blue chrominance information and blue chrominance information of a corresponding pixel of the input image; and
    corrects red chrominance information of the input image by applying as a weight a ratio between the first red chrominance information and red chrominance information of a corresponding pixel of the input image.

11. The apparatus of claim 8, wherein the chrominance information correction calculating unit:
    corrects blue chrominance information of the input image by applying as a weight a ratio between the second blue chrominance information and blue chrominance information of a corresponding pixel of the second reference image; and
    corrects red chrominance information of the input image by applying as a weight a ratio between the second red chrominance information and red chrominance information of a corresponding pixel of the second reference image.

12. A method of processing an image to correct image distortion caused by a hand shake, the method comprising:
    acquiring a first and a second reference images by using different shutter times associated with the hand shake, an amount of light, brightness and color reproduction, and international standard organization (ISO) values associated with noise in an image;
    correcting color information of an input image, which is obtained by using a shutter time that is used to acquire the first reference image, based on a brightness ratio and a chrominance ratio of the reference images; and
    removing noise in the input image based on edge information of a color information corrected image, which is the input image after correcting the color information,
    wherein acquiring two reference images comprises:
    acquiring the first reference image by using a first shutter time and a first ISO value; and
    acquiring the second reference image by using a second shutter time, which is longer than the first shutter time, and a second ISO value, which is less than the first ISO value,
    wherein the removing of the noise comprises:
    extracting brightness change direction information of the color information corrected image;
    extracting edge information of the color information corrected image based on the brightness change direction information; and
    reducing noise in the color information corrected image based on the edge information, and
    wherein the first reference image and the second reference image are successive frames.

13. The method of claim 12, wherein the second shutter time is 4 to 8 times longer than the first shutter time, and the first ISO value is 4 to 8 times greater than the second ISO value.

14. The method of claim 12, wherein each of the first and the second reference images has a resolution that is lower than a resolution of the input image.

15. The method of claim 14, wherein each of the first and the second reference images is acquired as a preview-size image and the input image is acquired as a full-size image.

16. The method of claim 12, wherein correcting color information of the input image comprises:
    analyzing a brightness histogram of the first reference image and a brightness histogram of the second reference image;
    correcting brightness of the input image based on brightness histogram transformation between the first reference image and the second reference image;
    extracting chrominance information of corresponding pixels of the first reference image and the second reference image; and
    correcting chrominance information of the input image based on the chrominance information of the corresponding pixels of the first reference image and the second reference image.

17. The method of claim 16, wherein analyzing the brightness histogram comprises defining:
    a first minimum level where the first minimum level is a brightness level corresponding to a first occurrence of a predetermined number of pixels in the brightness histogram of the first reference image;
    a first maximum level where the first maximum level is a brightness level corresponding to a last occurrence of a predetermined number of pixels in the brightness histogram of the first reference image;
    a second minimum level where the second minimum level is a brightness level corresponding to a first occurrence of a predetermined number of pixels in the brightness histogram of the second reference image; and
    a second maximum level where the second maximum level is a brightness level corresponding to a last occurrence of a predetermined number of pixels in the brightness histogram of the second reference image.

18. The method of claim 17, wherein correcting the brightness comprises stretching a brightness histogram of the input image based on a difference between the second minimum level and the first minimum level and a difference between the second maximum level and the first maximum level.

19. The method of claim 16, wherein extracting the chrominance information comprises extracting:
   first blue chrominance information that is an average of blue chrominance signals of a first N×N region (N is a positive number) about a corresponding pixel of the first reference image;
   first red chrominance information that is an average of red chrominance signals of the first N×N region;
   second blue chrominance information that is an average of blue chrominance signals of a second N×N region about a corresponding pixel of the second reference image; and
   second red chrominance information that is an average of red chrominance signals of the second N×N region.

20. The method of claim 19, wherein correcting the chrominance information comprises:
   correcting blue chrominance information of the input image by applying as a weight a ratio between the second blue chrominance information and the first blue chrominance information; and
   correcting red chrominance information of the input image by applying as a weight a ratio between the second red chrominance information and the first red chrominance information.

21. The method of claim 19, wherein correcting the chrominance information comprises:
   correcting blue chrominance information of the input image by applying as a weight a ratio between the first blue chrominance information and blue chrominance information of a corresponding pixel of the input image; and
   correcting red chrominance information of the input image by applying as a weight a ratio between the first red chrominance information and red chrominance information of a corresponding pixel of the input image.

22. The method of claim 19, wherein correcting the chrominance information comprises:
   correcting blue chrominance information of the input image by applying as a weight a ratio between the second blue chrominance information and blue chrominance information of a corresponding pixel of the second reference image; and
   correcting red chrominance information of the input image by applying as a weight a ratio between the second red chrominance information and red chrominance information of a corresponding pixel of the second reference image.

23. The method of claim 12, wherein the brightness change direction information is generated based on brightness changes in 8 directions of a region of interest about a pixel of interest.

24. The method of claim 12, wherein extracting the edge information comprises determining whether edges exist by defining an association function with neighboring pixels with respect to a brightness signal of an image input from the color information correcting unit.

25. The method of claim 12, further comprising correcting brightness of a color information corrected image, which is the input image after correcting the color information, using a gamma curve based on a brightness histogram of the color information corrected image.

26. The method of claim 25, wherein correcting the brightness comprises:
   extracting brightness information of the color information corrected image based on the brightness histogram of the color information corrected image;
   generating a gamma curve based on the brightness information of the color information corrected image; and
   applying the generated gamma curve to the color information corrected image.

27. The method of claim 26, wherein the brightness histogram of the color information corrected image is generated by NH-Quantization.

28. The method of claim 25, further comprising removing noise in the input image based on edge information of the input image, before correcting the brightness.

* * * * *